United States Patent Office 3,726,859
Patented Apr. 10, 1973

3,726,859
PROCESS FOR THE PREPARATION OF CELLULOSE DERIVATIVES CONTAINING CARBAMOYL-ETHYL GROUPS
Konrad Engelskirchen, Lank, and Joachim Galinke, Dusseldorf-Holthausen, Germany, assignors to Henkel & Cie. GmbH, Dusseldorf, Germany
No Drawing. Continuation-in-part of application Ser. No. 20,803, Mar. 18, 1970. This application Oct. 27, 1971, Ser. No. 193,194
Claims priority, application Germany, Apr. 23, 1969, P 19 20 493.4
Int. Cl. C08b *11/20*
U.S. Cl. 260—232
9 Claims

ABSTRACT OF THE DISCLOSURE

An improved process for the preparation of water-soluble carbamoylethylated cellulose derivatives from cellulose and acrylamide in an alkaline medium, which comprises suspending a cellulose derivative containing water-solubilizing non-ionic groups and free hydroxyl groups in an inert organic solvent, and treating the resulting suspension with acrylamide in the presence of an alkali or a quaternary ammonium base.

REFERENCE TO A PRIOR APPLICATION

This application is a continuation-in-part of our copending U.S. patent application Ser. No. 20,803, filed Mar. 18, 1970, now abandoned.

BACKGROUND OF THE INVENTION

The preparation of water-soluble cellulose derivatives by subjecting cellulose to an addition reaction with acrylamide is known (see U.S. Pat. 2,338,681, for instance). Thus, by reacting alkali cellulose with acrylamide in a molar ratio of cellulose:NaOH:acrylamide of about 1:2:1–5 in a kneader, it is possibe to obtain water soluble cellulose derivatives with a nitrogen content of 1–4.5%; these products, however, comprise a relatively large number of undesired carboxyethyl groups due to hydrolysis of carbonamide groups and therefore precipitate from their aqueous solutions in the acid range. If the reaction is performed in the presence of a quaternary ammonium base instead of sodium hydroxide, no water-soluble cellulose derivatives are obtained.

An attempt has also been made to avoid the hydrolysis of carbonamide groups during the reaction of cellulose with acrylamide by performing the reaction in the presence of relatively dilute sodium hydroxide (see U.S. Pat. 3,029,232, for example). In order to achieve the degree of swelling of the cellulose required for the reaction, however, it is necessary under these conditions to add large amounts of certain inorganic salts, such as sodium thiocyanate or potassium iodide, to the reaction mixture. Moreover, cellulose derivatives with the desired high nitrogen-content can be obtained in such an environment only if the acrylamide reactant is provided in large excess over the stoichiometrically required amount, such as about 15 mols of acrylamide per anhydroglucose unit of the cellulose.

The purportedly improved process outlined, in the preceding paragraph, therefore, has several significant disadvantages. First, it involves the consumption of an inordinately large amount of chemicals. Secondly, by virtue of the presence of a relatively large quantity of water, the carbamoylethylated cellulose derivative dissolves in the course of the reaction and must be re-precipitated from the resulting highly viscous solution by addition of large quantities of organic solvents. And finally, since the desired cellulose derivative is contaminated with relatively large amounts of inorganic salts, it must be purified by a very cumbersome procedure.

The substitution of a quaternary ammonium base for the sodium hydroxide in this process, on the other hand, leads to products with a very low nitrogen-content which are insoluble in water.

Thus, the known processes for the preparation of nitrogen-containing cellulose derivatives by reacting cellulose with acrylamide either involve inordinately large expenditures of materials and labor and lead to products with an undesirably high carboxyethyl group content, or they lead to cellulose derivatives which, although substantially free from carboxyethyl groups, are insoluble in water.

OBJECT OF THE INVENTION

It is an object of the present invention to overcome the disadvantages and shortcomings of the known methods for preparing water-soluble, nitrogen-containing cellulose derivatives and provide a simple, economical and efficient process for the preparation of water-soluble carbamoylethylated cellulose derivatives substantially free from carboxyethyl groups, and having a relatively high nitrogen content.

It is another object of the present invention to provide a process for the preparation of a hydroxyethyl carbamoylethylated cellulose substantially free from carboxyethyl groups, which consists essentially of subjecting a suspension of 1 part by weight of an unpurified alkali hydroxyethyl cellulose prepared by the addition of from 0.5 to 1 part of ethylene oxide to 1 part of cellulose in the presence of from 0.2 to 0.3 part by weight of an alkali alkoxylation catalyst per part by weight of cellulose in about 1 to 8 parts by weight of an inert organic solvent to an addition reaction with from about 0.6 to 1 part by weight, based on the starting cellulose, of acrylamide for fifteen minutes to two hours at a temperature from 50° C. to 100° C., and isolating said hydroxyethyl carbamoylethylated cellulose containing not more than 0.1 carboxyethyl group per anhydroglucose unit from the reaction mixture.

It is a further object of the present invention to provide a process for the preparation of a hydroxyethyl carbamoylethylated cellulose substantially free from carboxyethyl groups, which consists essentially of subjecting a suspension of 1 part by weight of a purified hydroxyethyl cellulose having an average number of mols of ethylene oxide of from 0.5 to 2.5 per anhydroglucose unit in the presence of from 0.01 to 0.1 part by weight of a quaternary ammonium base alkoxylation catalyst, in about 1 to 8 parts by weight of an inert organic solvent to an addition reaction with from about 0.1 to 1.2 parts by weight of acrylamide for 1 to 8 hours at a temperature of from 30° C. to 100 C., and isolating said hydroxyethyl carbamoylethylated cellulose containing not more than 0.1 carboxyethyl group per anhydroglucose unit from the reaction mixture.

Other objects and advantages of the invention will become apparent as the description thereof proceeds.

THE INVENTION

In accordance with the present invention, the above objects and advantages are achieved, in principle, by suspending a cellulose derivative comprising water-solubilizing non-ionic groups and free hydroxyl groups in an inert organic solvent, and treating the resulting suspension with acrylamide in the presence of an alkali or a quaternary ammonium base.

In general, any non-ionic cellulose derivative which is water-soluble or even merely capable of swelling in water may be used as the starting material in the process of the present invention, provided it contains a sufficient number of free hydroxyl groups. Typical examples of such cellulose derivatives are methylcellulose, hydroxyethylcellulose, methylhydroxyethylcellulose, hydroxypropylcellulose, methylhydroxypropylcellulose and the like. However, a preferred class of such cellulose derivatives is hydroxyethylated cellulose with an average number of mols of ethylene oxide (MS) of from 0.5 to 2.5, preferably 1 to 2.2 per anhydroglucose unit.

The present invention is directed to a process for the preparation of a hydroxyethyl carbamoylethylated cellulose substantially free from carboxyethyl groups, which consists essentially of subjecting a suspension of 1 part by weight of an unpurified alkali hydroxyethyl cellulose prepared by the addition of from 0.5 to 1 part of ethylene oxide to 1 part of cellulose in the presence of from 0.2 to 0.3 part by weight of an alkali alkoxylation catalyst per part by weight of cellulose in about 1 to 8 parts by weight of an inert organic solvent to an addition reaction with from about 0.6 to 1 part by weight, based on the starting cellulose, of acrylamide for fifteen minutes to two hours at a temperature from 50° C. to 100° C., and isolating said hydroxyethyl carbamoylethylated cellulose containing not more than 0.1 carboxyethyl group per anhydroglucose unit from the reaction mixture.

The present invention is also directed to a process for the preparation of a hydroxyethyl carbamoylethylated cellulose substantially free from carboxyethyl groups, which consists essentially of subjecting a suspension of 1 part by weight of a purified hydroxyethyl cellulose having an average number of mols of ethylene oxide of from 0.5 to 2.5 per anhydroglucose unit in the presence of from 0.01 to 0.1 part by weight of a quaternary ammonium base alkoxylation catalyst, in about 1 to 8 parts by weight of an inert organic solvent to an addition reaction with from about 0.1 to 1.2 parts by weight of acrylamide for 1 to 8 hours at a temperature of from 30° C. to 100° C., and isolating said hydroxyethyl carbamoylethylated cellulose containing not more than 0.1 carboxyethyl group per anhydroglucose unit from the reaction mixture.

The process according to the invention may be carried out with purified cellulose derivatives containing water-solubilizing groups as well as with the corresponding unpurified cellulose derivatives. An inert organic solvent is used as the reaction medium in all cases. Suitable such solvents are those which do not dissolve the mixed cellulose ether produced, but on the other hand have a good dissolving capability with respect to the acrylamide and are largely inert towards the latter under the selected reaction conditions. Thus, examples of suitable such solvents are tert. butanol, isopropanol, acetone or the like. Primary alcohols, such as ethanol or methanol, are less desirable.

The lower limit of the quantity of solvent which is used for suspending the cellulose derivative starting material is predicated upon the ease with which the system can be stirred and the dissolving capability of the organic solvent with respect to the acrylamide. In general, 1 to 8 parts by weight of solvent should be used for each part by weight of cellulose derivative starting material.

For effecting the process of the invention, it is possible to choose between two methods of operation, each of which offers certain advantages. In the first of these, the unpurified cellulose derivative starting material may be reacted with the acrylamide directly in the reaction mixture in which the former was prepared, i.e. without previous isolation. In this preferred form, for example, carbamoylethyl hydroxyethyl cellulose is prepared by first suspending cellulose in known fashion in an inert organic solvent, converting it into alkali-cellulose by addition of aqueous caustic soda and then reacting this with ethylene oxide at a suitably elevated temperature. After completion of the ethoxylation, the reaction mixture is admixed with acrylamide and stirred for a short time at an elevated temperature. The cellulose derivative containing carbamoylethyl groups obtainable according to the present invention can be isolated from this reaction mixture.

The amount of ethylene oxide itself can be reduced as compared with the preparation of pure hydroxyethyl cellulose without impairing the water-solubility of the mixed ether obtained thereby. Weight ratios of cellulose: ethylene oxide of 1:0.5–1, preferably 1:0.6–0.7, have proved favorable. Higher amounts of ethylene oxide are unsuitable for economic reasons, and lower amounts of ethylene oxide impair the water-solubility of the mixed ether. The amount of acrylamide subsequently added is generally such that 0.6 to 1 part by weight of amide is provided for each part by weight of the not yet substituted cellulose. In this mixed etherification 0.2 to 0.3 part by weight of alkali, preferably NaOH, are used for each part by weight of cellulose. These amounts of alkali correspond to those which have been found favorable in known processes for the preparation of hydroxyethylcellulose. All other reaction conditions, such as type and amount of the suspension agent and the content of water of the reaction mixture, are suitably selected from this viewpoint.

The above described etherification with acrylamide is advantageously effected at a temperature of about 50 to 100° C., especially 60 to 80° C., for from 15 minutes to 2 hours, especially 30 minutes to 1 hour.

In the above described embodiment of the process of the present invention the degree of carbamoylethylation attainable is determined by the amount of alkali which is used. At a weight ratio of cellulose:NaOH of about 1:0.2–0.3, mixed ethers with nitrogen contents of at most about 3% are obtained if 0.6 to 1 part by weight of acrylamide is used for each part by weight of unsubstituted cellulose. This nitrogen content corresponds to a degree of carbamoylethylation of about 0.6. The mixed ethers obtained from this embodiment of the process generally contain not more than 0.1 carboxyethyl group per anhydroglucose unit.

The other favorable embodiment of the process of the present invention, which leads to carbamoylethyl hydroxyethyl cellulose usually completely free from carboxyethyl groups, is described below. In this embodiment the starting material is purified hydroxyethylcellulose, which is reacted with acrylamide in the presence of 0.01 to 0.1, preferably 0.025 to 0.075, parts by weight for each part by weight of hydroxyethylcellulose of a quaternary ammonium base which acts as a catalyst.

Essentially, all catalytically acting quaternary alkyl-, aryl- and alkylaryl-ammonium hydroxides, such as tetraethylammonium hydroxide, tetramethyl-ammonium hydroxide, hydroxyethyl-trimethyl-ammonium hydroxide and benzyl-trimethyl-ammonium hydroxide, may be used. These compounds are advantageously employed in the form of aqueous solutions. The reaction mixture in this embodiment of the process should contain only small amounts of water. The water content of the reaction mixture should vary between 0.1 and 2 parts by weight for each part by weight of cellulose. If the amount of water is significantly higher, this may lead to poorer yields and also make it more difficult to work up the reaction mixture.

In this embodiment the hydroxyethyl cellulose is advantageously first suspended in a solution of acrylamide in an organic solvent, the catalyst is then added, and the carbamoylethylation reaction is carried out at an elevated temperature. This embodiment yields mixed ethers with a relatively high nitrogen content, for example 5% or higher, if 1 part by weight of acrylamide is used for each part by weight of hydroxyethyl cellulose. The amount of acrylamide provided depends in each case upon the desired degree of carbamoylethylation. In general, 0.1 to 1.2 preferably 0.2 to 1, part by weight of acrylamide are used for each part by weight of hydroxyethyl cellulose. The above-described reaction is carried out at a temperature of about 30 to 100° C., especially 50 to 80° C., and the reaction time is about 1 to 8 hours, preferably 2 to 4 hours. The mixed ethers obtained from this embodiment of the process contain not more than 0.1 carboxyethyl group per anhydroglucose unit, and are usually completely free of carboxyethyl groups.

If the reaction temperature is significantly reduced, disproportionately long reaction times must be taken into account. An increase of the reaction temperature above the upper limit of the indicated range leads to strong and undesirable discolorations.

After completion of the reaction, the mixed cellulose ethers produced according to the invention are isolated, if necessary after prior neutralization of the reaction mixture, for example by filtering or centrifuging, and then purified by washing with an inert organic solvent. Examples of suitable washing solvents are primary or secondary aliphatic alcohols of about 2 to 4 carbon atoms which may have a water content up to about 20%. An advantage of this second embodiment of the process is that practically no side reactions occur. In particular, the acrylamide which has not reacted is present practically unchanged and can easily be recovered.

In the process according to the invention, after the reaction product is washed with an organic solvent, it is advantageously dried, for example in a drum drier, in a circulating air drier or in a vacuum drier. Care should be taken that gentle drying temperatures between about 40 and 80° C. are applied, since mixed cellulose ethers produced according to the process of the invention are relatively sensitive to excessive temperatures.

The process of the invention produces mixed ethers with a relatively high nitrogen content, namely up to 5% and higher. These are attained when, for example, 1 part by weight of acrylamide has been used for each part by weight of hydroxyethyl cellulose.

The mixed ethers which are readily accessible by the process according to the present invention are characterized by a high resistance against enzyme degradation. In this respect they are much superior to pure hyroxyethyl cellulose. Further, they can easily be cross-linked by heat treatment to yield insoluble products. In contradistinction from cellulose derivatives with a comparable nitrogen content, but containing only carbamoylethyl groups, they produce a clear solution in water and are also not reprecipitated by addition of acids as, for example, carbamoylethyl carboxyethyl celluloses are.

It was heretofore not possible to prepare water-soluble mixed cellulose ethers which contain carbamoylethyl groups and are completely free from carboxyethyl groups. Now, however, such products may be obtained by the process according to the invention from purified hydroxyethyl cellulose in the presence of a quaternary ammonium base, as described above. Moreover, it should be pointed out that, even when hydroxyethyl cellulose which is merely swellable in water as distinguished from water-soluble is used, water-soluble mixed ethers substantially completely free from carboxyethyl groups are obtained.

The following examples further illustrate the present invention and will enable others skilled in the art to understand it more completely. It should be understood, however, that the invention is not limited solely to the particular examples given below.

The nitrogen contents given in the examples below were determined by the Kjeldahl method.

EXAMPLE 1

17.2 gm. of air-dried cellulose powder were suspended in 170 ml. of isopropanol and, while vigorously stirring, the suspension was admixed with a solution of 4.8 gm. of NaOH in 32 gm. of water over a period of 15 minutes; the mixture was then stirred for 5 minutes more. The resulting alkali cellulose suspension was then admixed with 9.6 gm. of ethylene oxide, and the mixture was heated to 60° C. and then stirred for 2 hours at this temperature. Thereafter, 15 gm. of acrylamide were added, and the mixture was stirred at 70° C. for half an hour. Subsequently, the reaction mixture was neutralized with dilute acetic acid, and the mixed cellulose ether was filtered off, washed with aqueous 80% isopropanol until substantially free from salt, and dried in vacuo at room temperature.

25 gm. of a white powder with a nitrogen content of about 2.8% and a sulfate ash content of only 2.3% were obtained. These values correspond to about 0.5 carbamoylethyl and about 0.07 carboxyethyl group per anhydroglucose unit, assuming that 1.1 hydroxyethyl groups were introduced per anhydroglucose unit. The product formed a clear solution in water and acids.

Further experiments were conducted with various amounts of sodium hydroxide and acrylamide, and these tests resulted in varying amounts of carbamoylethyl groups and carboxyethyl groups. Otherwise the conditions and the reagents utilized were the same as in Example 1 above. In the following table the additional data are listed as Examples 1a, 1b and 1c.

| | NaOH, grams | Acrylmide, grams | Carbamoylethyl groups | Carboxyethyl groups |
|---|---|---|---|---|
| Example: | | | | |
| 1a | 4.8 | 10 | 0.32 | 0.1 |
| 1b | 3.2 | 15 | 0.40 | 0.05 |
| 1c | 3.2 | 10 | 0.23 | 0.04 |

EXAMPLE 2

(a) 5.3 gm., (b) 10.5 gm., (c) 15.7 gm. (d) 21 gm. and (e) 25.25 gm. of acrylamide were each dissolved in separate 75 gm. portions of acetone, and insoluble material was filtered off from each of the solutions. 25 gm. of a hydroxyethyl cellulose with an average number of mols of ethylene oxide (MS) of about 2.2 were suspended in each of the filtrates. The resulting suspensions were each admixed with a solution of 1.25 gm. of tetraethyl ammonium hydroxide in 5 gm. of water and stirred for 3 hours at about 60° C. (reflux).

The mixed cellulose ethers were filtered off, first washed with 80% isopropanol until neutral, and then freed from water with pure isopropanol. The products obtained thereby were dried in vacuo at room temperature. All the products produced a clear solution in water.

In the following table the letters in the first column on the left identify the batches (a) to (e). The following columns, from left to right, give the respective product yield in grams, the found nitrogen content in percent by weight, and the carbamoylethyl groups introduced per anhydroglucose unit calculated therefrom.

| | Yield | Nitrogen, percent | Carbamoylethyl groups |
|---|---|---|---|
| Batch: | | | |
| a | 26.1 | 2.2 | 0.46 |
| b | 28.1 | 3.17 | 0.7 |
| c | 31.8 | 4.7 | 1.14 |
| d | 34.1 | 5.3 | 1.33 |
| e | 35.8 | 5.8 | 1.5 |

EXAMPLE 3

15 gm. of a water-insoluble hydroxyethyl cellulose with an average number of mols of ethylene oxide (MS) of 0.7 were suspended in a solution of 15 gm. of acrylamide in 60 gm. of acetone. The resulting suspension was admixed with 3.75 gm. of an aqueous 20% solution of tetraethyl ammonium hydroxide, and the mixture was stirred at about 60° C. (reflux) for 4 hours.

The mixed cellulose ether was filtered off, purified by washing with aqueous 70% isopropanol and then dried.

19.5 gm. of a white powder were obtained which had a nitrogen content of 5.1%, corresponding to a degree of carbamoylethylation of about 0.95.

A 2% aqueous solution of this product had a turbidity (Lange opacimeter) of 4%.

Comparative Test A

This test was carried out analogous to Example 7 of U.S. Pat. No. 2,338,681, except that tetraethylammonium hydroxide was used as the catalyst instead of aqueous sodium hydroxide.

34.4 gm. of air-dried cellulose powder (⅕ mol) were admixed in a kneader with 80 gm. of an aqueous 20% solution of tetraethylammonium hydroxide over a period of 5 minutes. Then, 71 gm. of acrylamide were added, and the mixture was kneaded for 5 hours at room temperature.

The reaction mixture was taken up in aqueous 60% isopropanol, and the solution was neutralized with acetic acid and then washed with aqueous 60% isopropanol until free from salt. After drying in vacuo at room temperature, 35 gm. of a white powder were obtained which had a nitrogen content of about 4.3%.

This product was completely insoluble in water.

Comparative Test B

This test was carried out analogous to Example 3 of U.S. Pat. No. 3,029,232, except that tetraethylammonium hydroxide was used as the catalyst instead of sodium hydroxide.

23 gm. of air-dried cellulose powder were suspended in a solution of 295 gm. of sodium thiocyanate in 295 gm. of aqueous 2% tetraethylammonium hydroxide, and the suspension was stirred for 45 minutes at room temperature. The suspension was then admixed with 0.2 gm. of phenyl-β-naphthylamine and 147 gm. of acrylamide, and the mixture was heated to 75° C., stirred for 6 hours at this temperature and, after standing overnight at room temperature, stirred for 7 hours more at 75° C. Thereafter, the thin liquid reaction mixture was stirred into 2 liters of methanol, and the cellulose derivative was filtered off, washed with aqueous 50% methanol until free from salt and dried.

The white powdery product obtained thereby contained only traces of nitrogen and was completely insoluble in water.

The carbamoylethylated cellulose derivatives obtained by the process according to the present invention have useful properties.

More particularly, they form clear, viscous solutions in water and, as such, are useful as thickening agents, adhesives, coating agents and binders. These solutions are especially characterized by an excellent resistance against bacterial degradation.

Thus, for instance, the products of the process according to the present invention are useful for the preparation of aqueous adhesive solutions which then may be used as adhesives for wallpaper or cigarette paper, where their resistance against bio-degradation is of great importance.

Furthermore, aqueous solutions of the cellulose derivatives according to the present invention are useful as binders for tobacco dust in the manufacture of tobacco leaf for cigars or the like. For example, by suspending tobacco dust in an aqueous solution of a cellulose derivative pursuant to the present invention, forming a thin sheet for the suspension in customary fashion, and drying the sheet at about 100° C., a tobacco foil of extraordinary resistance against enzymatic degradation is obtained.

Finally, aqueous solutions of the products of the instant invention are useful for forming water-insoluble coatings on sheet metal and the like. For instance, 25 x 100 x 2 mm. metal sheets made of iron or brass were dipped into an aqueous 2.5% solution of the product obtained in Example 2(c) above, the water was allowed to evaporate at room temperature from the coating, and then the coated sheet metal was heated for 30 minutes at 110° C. in a drying chamber. The protective coating thus obtained was practically water-insoluble.

While the present invention has been illustrated with the aid of certain specific embodiments thereof, it will be readily apparent to others skilled in the art that the invention is not limited to those particular embodiments, and that various changes and modifications may be made without departing from the spirit of the invention or the scope of the appended claims.

We claim:

1. A process for the preparation of a hydroxyethyl carbamoylethylated cellulose substantially free from carboxyethyl groups, which consitss essentially of subjecting a suspension of 1 part by weight of an unpurified alkali hydroxyethyl cellulose prepared by the addition of from 0.5 to 1 part of ethylene oxide to 1 part of cellulose in the presence of from 0.2 to 0.3 part by weight of an alkali alkoxylation catalyst per part by weight of cellulose in about 1 to 8 parts by weight of an inert organic solvent to an addition reaction with from about 0.6 to 1 part by weight, based on the starting cellulose, of acrylamide for fifteen minutes to two hours at a temperature from 50° C. to 100° C., and isolating said hydroxyethyl carbamoylethylated cellulose containing not more than 0.1 carboxyethyl groups per anhydroglucose unit from the reaction mixture.

2. A process according to claim 1 wherein said unpurified alkali hydroxyethyl cellulose is prepared by the addition of from 0.6 to 0.7 part of ethylene oxide to 1 part of cellulose.

3. A process according to claim 1, wherein the reaction temperature is from 60 to 80° C.

4. A process according to claim 1, wherein the reaction time is from 30 minutes to one hour.

5. A process for the preparation of a hydroxyethyl carbamoylethylated cellulose substantially free from carboxyethyl groups, which consists essentially of subjecting a suspension of 1 part by weight of a purified hydroxyethyl cellulose having an average number of mols of ethylene oxide of from 0.5 to 2.5 per anhydroglucose unit in the presence of from 0.01 to 0.1 part by weight of a quaternary ammonium base alkoxylation catalyst, in about 1 to 8 parts by weight of an inert organic solvent to an addition reaction with from about 0.1 to 1.2 parts by weight of acrylamide for 1 to 8 hours at a temperature of from 30° C. to 100° C., and isolating said hydroxyethyl carbamoylethylated cellulose containing not more than 0.1 carboxyethyl group per anhydrogluose unit from the reaction mixture.

6. A process according to claim 5, wherein the part by weight ratio of purified hydroxyethylcellulose:quaternary ammonium base alkoxylation catalyst is 1:0.025 to 0.075.

7. A process according to claim 5, wherein said acylamide is present in an amount of from 0.2 to 1 part by weight.

8. A process for the preparation of a hydroxyethyl carbamoylethylated cellulose substantially free from carboxyethyl groups, which consists essentially of subjecting a suspension of 1 part by weight of a purified hydroxyethyl cellulose having an average number of mols of ethylene oxide of from 0.5 to 2.5 per anhydroglucose unit in the presence of from 0.01 to 0.1 part by weight of a quaternary ammonium base alkoxylation catalyst selected from the group consisting of quaternary alkyl ammonium hydroxide, quaternary aryl ammonium hydroxide, and quaternary alkylaryl ammonium hydroxide, in about 1 to 8 parts by weight of an inert organic solvent to an addition reaction with from about 0.1 to 1.2 parts by weight of acrylamide for 1 to 8 hours at a temperature of from 30° C. to 100° C., and isolating said hydroxyethyl carbamoylethylated cellulose containing not more than 0.1 carboxyethyl groups per anhydroglucose unit from the reaction.

9. The process of claim 8, in which the alkoxylation catalyst is selected from the group consisting of tetraethyl-ammonium hydroxide, tetramethyl-ammonium hydroxide, hydroxyethyl-trimethyl-ammonium hydroxide, and benzyltrimethyl-ammonium hydroxide.

References Cited
UNITED STATES PATENTS
2,618,635  11/1952  Vaughn _____ 260—231

DONALD E. CZAJA, Primary Examiner
M. I. MARQUIS, Assistant Examiner

U.S. Cl. X.R.
117—127, 157; 131—17 AC; 260—231 R, 231 A